United States Patent Office 3,081,332
Patented Mar. 12, 1963

3,081,332
PROCESS FOR REACTING TRIALKYL PHOSPHITES WITH DISULFIDES TO PRODUCE PHOSPHOROTHIOLATE TRIESTERS
David E. Ailman, Pennington, N.J., and Richard W. Young, Cos Cob, Conn., assignors to American Cyanamid Company, New York, N.Y., a corporation of Maine
No Drawing. Filed Mar. 1, 1962, Ser. No. 176,769
8 Claims. (Cl. 260—461)

The present invention relates to a novel process for the preparation of phosphorothiolates. More particularly, it relates to phosphorothiolate preparation utilizing the reaction between a trialkyl phosphite and either a carbalkoxyalkyl disulfide or a carbamoylalkyl disulfide carried out under controlled reaction conditions.

Heretofore, a trialkylphosphite has been reacted with an organic disulfide to prepare a trialkyl monothiophosphate at temperatures in excess of about 120° C. Usually a catalyst was employed to initiate the reaction at lower temperatures. Resultant product was identified as a trialkyl phosphorothionate. In the absence of a catalyst, temperatures of at least 140° C., or even higher, were required to initiate the reaction with the formation of a S-substituted phosphorothiolate. See Journal American Chemical Society, 81, p. 1243, 1959.

It has been surprisingly found that the direct and straightforward reaction between a trialkyl phosphite and either a carbalkoxyalkyl disulfide or a carbamoylalkyl disulfide can occur at temperatures below about 110° C. in the absence of a catalyst to recover an S-substituted phosphorothiolate in good yield and purity. Where a simpler reactant, such as an unsubstituted alkyl disulfide, was reacted at temperatures below about 110° C., the corresponding S-substituted monophosphorothiolate was not obtained. In the latter environment it was observed that the only phosphorous-containing reaction product was the phosphorothionate, $(RO)_3P=S$, derived from the starting alkyl phosphite.

According to the process of the invention, at least one mol of a trialkyl phosphite is reacted with at least one mol of either a carbalkoxyalkyl disulfide or a carbamoylalkyl disulfide at a temperature ranging from about 25° C. to about 110° C. in the absence of a catalyst, and thereafter recovering the corresponding S-substituted phosphorothiolate. The over-all reaction may be graphically written as:

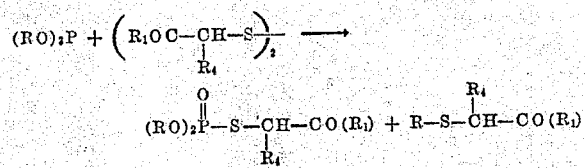

where R is a lower alkyl radical, such as methyl, ethyl or propyl, $R_1$ is a radical, such as either an alkoxy or $$-N\begin{matrix}R_2\\R_3\end{matrix}$$

where $R_2$ and $R_3$ are each hydrogen or lower alkyl radical, and $R_4$ is either hydrogen or a carbalkoxyalkyl radical, such as $-CH_2COR_5$, where $R_5$ is the same as $R_1$ above.

In general, the above reaction is unexpectedly carried out at temperatures which are substantially below those employed in apparent analogous reactions. Where the reaction temperature is permitted to rise above about 110° C., desired products are rapidly decomposed. Thus, temperatures should be maintained below about 110° C., and preferably below about 100° C. although for best commercial operation, temperatures between 80° C. and 95° C. are employed.

Illustrative disulfides employed in the process of the invention are:

2,2'-tetramethyldithiodisuccinate,
2,2'-tetraethyldithiodisuccinate,
2,2'-tetra-n-propyldithiodisuccinate,
2,2'-dimethyldithiodiacetate,
2,2'-diethyldithiodiacetate,
2,2'-dithiobis(N,N'-dimethylsuccinamide),
2,2'-dithiobis(N-methylacetamide),
2,2'-dithiobis(acetamide), and
2,2'-dithiobis(N,N-dipropylacetamide).

Typical trialkyl phosphites which can be employed are:

Trimethyl phosphite,
Triethyl phosphite, and
Tripropyl phosphite.

The trialkyl phosphite reactant is present in amounts equal to at least equal mols with respect to the disulfide reactant. A mol excess of phosphite ranging from 5% to 100% or even higher, can be employed, if desired.

Advantageously, the reaction can be carried out in the absence of any inert solvent medium. However, it is a preferred practice to utilize an inert solvent, such as benzene, toluene, petroleum ether, for ease of operation.

In order to facilitate a further understanding of the invention, the following examples are presented primarily for the purpose of illustrating certain more specific details thereof. The scope of the invention is not to be deemed limited thereby except as defined in the claims. Unless otherwise stated, the parts are by weight.

Example 1

In a suitable reaction vessel, 12.4 parts of trimethylphosphite are admixed with 30.7 parts of 2,2'-tetraethyldithiodisuccinate and heated for twenty-five hours at 95° C. Removal of excess phosphite and S-methyl diethylmercaptosuccinate by distillation leaves 18 parts of product of which maloxon, i.e., O,O-dimethyl S-[1,2-bis(ethyloxycarbonyl)ethyl]phosphorothioate, is the major constituent. Molecular distillation at 0.01 mm. Hg of the maloxon gives 12.5 parts of distillate containing 80% maloxon identified by gas-liquid chromatographic analysis.

Example 2

Trimethylphosphite (50 parts) is admixed in a suitable vessel with 2,2'-tetraethyldithiodisuccinate (30.7 parts), and heated for twenty hours at 95° C. Distillation of excess phosphite and by-products leaves 26 parts of liquid which is shown by molecular distillation to contain 19 parts of maloxon, 80% of theoretical yield.

Example 3

Trimethylphosphite (15.6 parts) is introduced into a reaction vessel and admixed with diethyldithiodiacetate (15.0 parts) in 30 parts of toluene at 98° C. The mixture is maintained at about 100° C. to 105° C. for eight hours and the product solution is contacted with aqueous sodium carbonate for the removal of acidic by-products. Removal of solvent and excess phosphite by molecular distillation leaves 22 parts of an oil which, by gas-liquid chromatography, is known to contain O,O-dimethyl S-ethyloxycarbonylmethyl phosphorothioate and ethyl ester of methyl mercapto-acetic acid, as the major constituents.

Example 4

Trimethylphosphite (1.2 parts) is mixed with a solution containing diethyldithiodiacetate (1.12 parts) in benzene at 80° C. After a reaction period of tweny-five hours, maintained at the latter temperature, the major constituents of the fraction boiling above 100° C. are shown by gas-liquid chromatography to be the ethyl ester of methylmercapto-acetic acid and O,O-dimethyl S-ethyl-oxycarbonylmethyl phosphorothioate.

*Example 5*

A mixture of 42 parts of trimethylphosphite and 60 parts of 2,2'-tetramethyldithiodisuccinate is heated in a reaction vessel at 90° C. for three hours. Upon molecular distillation at 0.07 mm. Hg and 97° C. to 103° C., a yield of 69% of O,O-dimethyl S-[1,2-bis(methyloxycarbonyl) methyl] phosphorothioate is recovered.

*Example 6*

To a suitable reaction vessel are added in admixture 66.7 parts of triethylphosphite and 82.1 parts of 2,2'-tetraethyldithiodisuccinate and heated for twenty hours at a temperature maintained at 95° C. to 110° C. Upon distillation at 146° C. to 156° C. under 0.45 mm. Hg, 74% of O,O-dimethyl S-[1,2-bis(ethyloxycarbonyl)ethyl] phosphorothioate is recovered.

*Example 7*

In a suitable vessel are admixed 45 parts of trimethylphosphite and 6.2 parts of 2,2'-dithiobis-(N-methylacetamide) in 50 parts of chloroform. The reaction mixture is heated to a temperature of 60° C. for two and one-half hours. Upon distillation at 105° C. under 0.003 mm. Hg, a 60% yield of O,O-dimethyl-S-(N-methylcarbamoylmethyl) phosphorothioate, as identified by infrared, is obtained. Index of refraction ($N_D^{25}$) is 1.5034.

Advantageously, the process of the present invention is applicable to the preparation of phosphorothiolates utilizing any of the disulfides as well as the alkyl phophites illustrated above.

We claim:

1. A process for preparing a phosphorothioate of the structure:

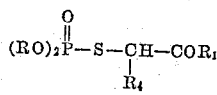

wherein R is a lower alkyl radical, $R_1$ is a radical selected from the group consisting of (lower) alkoxy and

where $R_2$ and $R_3$ are each selected from the class consisting of hydrogen and a lower alkyl, and $R_4$ is a radical selected from the group consisting of hydrogen and —$CH_2COR_5$, where $R_5$ is defined as the $R_1$ radical above, which consists essentially in: bringing into reactive combination at least equimolar proportions of a trialkyl phosphite of the structure:

and a disulfide of the structure

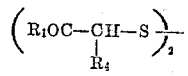

wherein R, $R_1$ and $R_4$ are defined as above, maintaining the temperature of reaction between about 25° C. and about 110° C., and thereafter recovering so-formed phosphorothioate.

2. The process according to claim 1, wherein the trialkyl phosphite is trimethylphosphite and the disulfide is 2,2'-tetraethyldithiosuccinate.

3. The process according to claim 1, wherein the trialkyl phosphite is triethylphosphite and the disulfide is 2,2'-tetraethyldithiodisuccinate.

4. The process according to claim 1, wherein the trialkyl phosphite is trimethylphosphite and the disulfide is 2,2'-diethyldithioacetate.

5. The process according to claim 1, wherein the trialkyl phosphite is trimethylphosphite and the disulfide is 2,2'-tetramethyldithiodisuccinate.

6. The process according to claim 1, wherein the trialkyl phosphite is trimethylphosphite and the disulfide is 2,2'-dithiobis(N-methylacetamide).

7. The process according to claim 2, wherein the reaction temperatures employed are within the range between about 80° C. and 95° C.

8. The process according to claim 6, wherein the reaction temperature utilized is about 60° C.

References Cited in the file of this patent

Jacobson et al.: "J. Am. Chem. Soc.," vol. 77, pages 6064–6065 (1955).

Poshkus et al.: "J. Am. Chem. Soc.," vol. 79, page 4245 (1957).